UNITED STATES PATENT OFFICE.

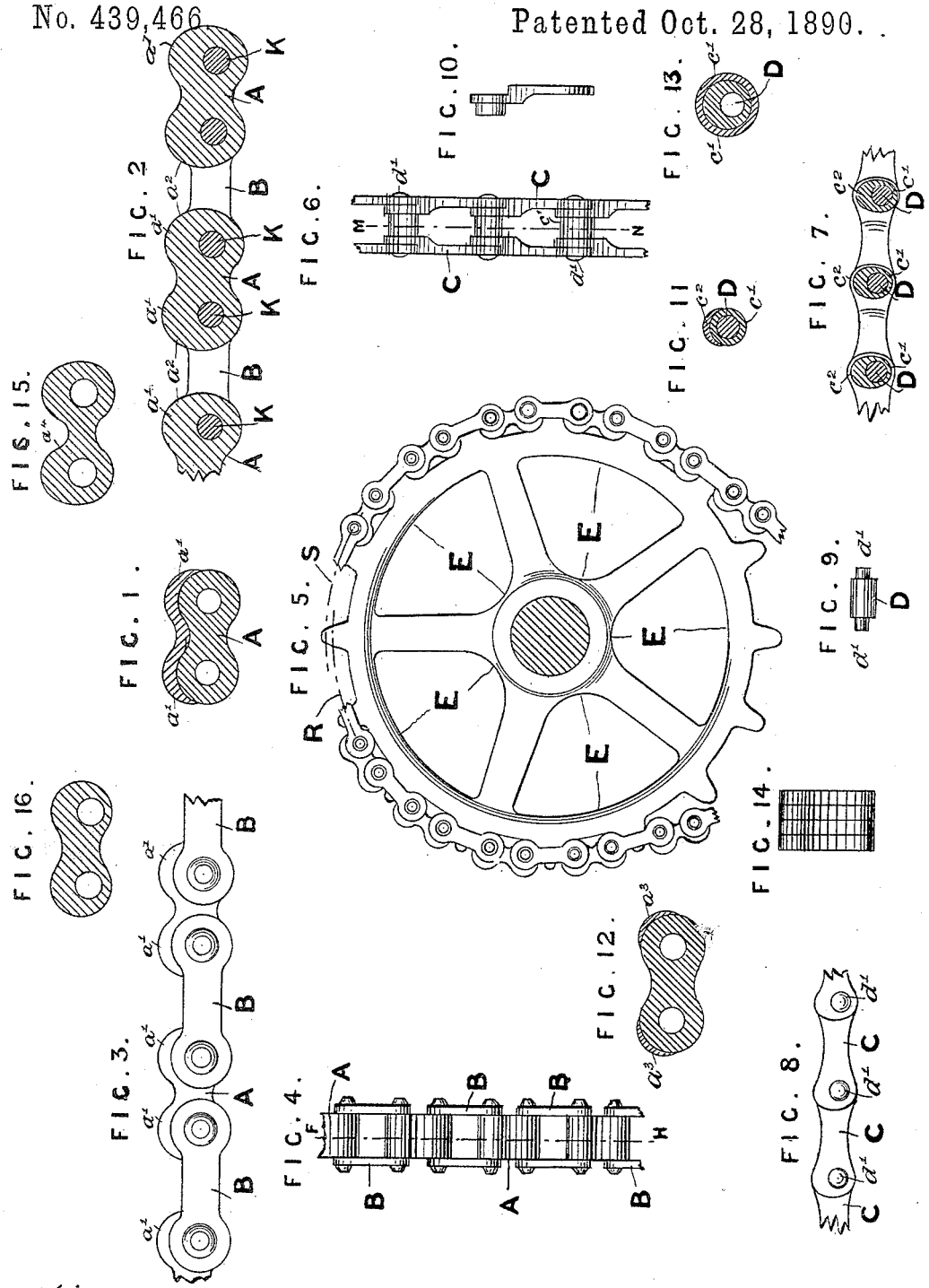

CHARLES HENRY BRAMPTON, OF BIRMINGHAM, ENGLAND.

DRIVE-CHAIN.

SPECIFICATION forming part of Letters Patent No. 439,466, dated October 28, 1890.

Application filed July 1, 1890. Serial No. 357,386. (No model.) Patented in England December 2, 1889, No. 19,321.

*To all whom it may concern:*

Be it known that I, CHARLES HENRY BRAMPTON, manufacturer, of 14 Oliver Street, Birmingham, in the county of Warwick, England, and a subject of the Queen of Great Britain, have invented certain new and useful Improvements in Driving-Chains for Bicycles, Tricycles, and other Purposes, (for which I have obtained Letters Patent in Great Britain No. 19,321, dated December 2, 1889,) of which the following is a specification.

My invention has for its object improvements in driving-chains for bicycles, tricycles, and other purposes, and is for the purpose of giving a larger or more useful life to such chains whether they be used for vehicles—such as velocipedes—or for the driving of machinery of any kind, though they are specially applicable to the driving of velocipedes. At present, when driving-chains have been worn to a considerable extent, the usefulness is greatly impaired, because not only is the length of the chain increased by the wear at the joints, but the pitch of each link is perceptibly increased, so that even after the chain is tightened by the removal of one or more links there is a distinct and constant tendency for the chain to ride upon every tooth of the wheels as they present themselves, and the result is continuous jerks, which are both disagreeable and dangerous to the rider and greatly detrimental to the machine. There are also other disadvantages inherent to such a state of things. The present mode of dealing with this trouble is to tighten the chain by increasing the length between the center of the wheels or by the removal of one or more links or by renewing the chain.

Now my invention, which I call a "double-pitch chain," is intended to prevent the need of renewals in a great measure, if not entirely, by supplying a chain which will move nearly approximate in its own life to that of the machine itself, so that when a machine is sold with my new chain the owner will be able by the ordinary facilities he possesses to always keep the chain in working condition. Chains as at present made have their holes or joint-pins concentric with the links or driving-blocks, so that both sides are practically alike.

In order that my invention may be clearly understood and more easily carried into practice, I have appended hereunto a double-sized sheet of drawings, upon which I have illustrated my invention as applied to two different types of chains, and which will enable others to apply the principle to other kinds of chains to which my invention may be applicable; but I do not confine myself by any means to the two examples shown. Neither do I claim the principles of the construction of the chains shown, as both are well-known types now in the market.

Figure 1 shows the driving-block A of a chain as now used, perhaps, more widely than any other type of chain, and also the addition of my improvement thereto of the extra metal $a'$, with the sectional lines running in the contra direction to those of the old portion A. Fig. 2 is an enlarged longitudinal sectional elevation through the center of the chain on line F H, Fig. 4. Fig. 3 is a side elevation of the same chain as in the case of the previous figure. Fig. 4 is a plan showing both side links B, as well as the driving-blocks A. Fig. 5 is an elevation of a chain-wheel E, with the A side of the chain in wear on next to the wheel on the left side thereof and the $a'$ side of the chain next to the wheel on the right-hand side thereof. Fig. 6 is a plan of the second type of chain now in the market, in which the driving-blocks $c'$ are one piece with the links C, which gives a less number of joints in any given chain. Fig. 7 is a sectional side elevation on line M N, showing the extra thickness of the metal $c^2$ on one side thereof; but it is shown more clearly by the supplemental section, Fig. 11, where the extra metal is shown by sectional lines running in an opposite direction, as in Fig. 1. Fig. 8 is a side elevation of the same chain as that shown in section by Fig. 7. Fig. 9 shows the pivot-pin for the second type of chain; but my invention makes no difference to that portion. Fig. 10 is a view showing the side link $c$ with its solid block $c'$ forged or made thereon, which is likewise not new, except in regard to the extra-thickness piece $c^2$, which I am about more fully to explain. Fig. 11 represents a vertical section in detail of a block belonging to the second type of chain. Fig. 12 represents a slight modification of the block shown in Fig. 1, the views being similar. Fig. 13 represents a modification of the block used in the second type of chain. Fig. 14 is an end elevation of blocks like Fig. 1, but made in several thicknesses. Fig. 15 is another modification of Fig. 1.

Now taking the first or more ordinary type of chain, as illustrated by Figs. 1 to 5, there is the A side of the chain, which is the ordinary size as now used, and the $a'$ side, which constitutes my present invention. In all cases the ordinary side would be first applied when the chain is new, as seen at the left side of Fig. 5, and would be run on that side until the chain had been elongated, say, about two per cent., more or less, according to construction or desire of the owner. During this time the pins K would be worn to a perfect bearing in the links and the pitch of the chain, which exactly corresponds with the teeth of the wheel E to commence with, would now be found to be longer, and therefore would lie upon the wheel very loosely and would work with more or less tendency to ride upon the teeth to shake and to jerk in working. Now while the chain has been working on its A side the center line of its working diameter upon the wheel E has been that represented by dotted lines R. The chain is now simply reversed, thus bringing my new side $a'$ next to the wheel, as seen at the right hand of Fig. 5, where the working-diameter center line is represented by the dotted lines S, which is larger in diameter than R by the difference in two thicknesses of the extra metal $a'$, as seen at Fig. 1 in the first type of chain, or the extra metal $c^2$, as seen at Fig. 11 in the second type of chain. Thus the parts $a^2$ of the blocks when worked inwardly, as on the right side of Fig. 5, are brought nearer together on account of their greater distance from the centers K, and the effective pitch of the chain is thus practically reduced. An approximation of the above result may be made by the addition of a little metal, such as shown by $a^3$, Fig. 12; but it will only be an approximation, because the configuration of the two sides of the driving-block A would be different and therefore would not fit the wheel as effectively as in the case of Figs. 1 and 11.

The driving-blocks $c'$ may be made quite round, as seen at Fig. 13, so as to allow a friction roller or ring $c^3$ to turn thereon; also the driving-blocks A may be made in a number of thicknesses or plates, as shown by Fig. 14, say, four, more or less. The enlargement $a'$ on the block A may sometimes only leave its extra thickness, as shown at Fig. 15, in which case the block is lighter by cutting more metal out of the hollow of the second side, as seen at $a^4$.

A similar effect to the extra metal $a'$ is produced by drilling the links eccentrically, as seen at Fig. 16, where the driving-block A is exactly the size of A, Fig. 1.

What I claim, then, is—

In driving-chains for bicycles and other mechanism, a series of reversible driving-blocks and the intermediate connecting devices, each driving-block having both of its faces rounded and adapted to fit on a sprocket-wheel, and also having the rounded part on the outer side thicker than on the inner side, forming an enlargement at each end of approximately semicircular shape, substantially as set forth.

In testimony that I claim the foregoing as my own I affix my name in the presence of two witnesses.

CHARLES HENRY BRAMPTON.

Witnesses:
 GEORGE PRICE,
 GEORGE BARKER.